United States Patent

Manos

[11] Patent Number: 5,526,845
[45] Date of Patent: *Jun. 18, 1996

[54] VALVE CARTRIDGE

[75] Inventor: Harron G. Manos, Carrollton, Tex.

[73] Assignee: NoMix, Inc., Carrollton, Tex.

[*] Notice: The term of this patent shall not extend beyond the expiration date of Pat. No. 5,400,822.

[21] Appl. No.: 314,147

[22] Filed: Sep. 28, 1994

Related U.S. Application Data

[63] Continuation-in-part of Ser. No. 151,294, Nov. 15, 1993, Pat. No. 5,400,822.

[51] Int. Cl.⁶ .................................. F16K 11/078
[52] U.S. Cl. ..................... 137/625.17; 137/625.4; 137/636.4
[58] Field of Search ............. 137/454.6, 625.17, 137/625.4, 625.41, 636.4

[56] References Cited

U.S. PATENT DOCUMENTS

| | | | |
|---|---|---|---|
| 3,103,231 | 9/1963 | Moen | 137/454.2 |
| 3,204,656 | 9/1965 | Moen | 137/625.17 X |
| 3,211,181 | 10/1965 | Fraser et al. | 137/625.17 |
| 3,285,278 | 11/1966 | Corlett | 137/625.17 X |
| 3,354,910 | 11/1967 | Moen | 137/625.17 |
| 3,428,088 | 2/1969 | Bell | 137/625.17 |
| 3,519,020 | 7/1970 | Perret-Gentil | 137/625.17 |
| 3,532,123 | 10/1970 | Anthony | 137/636.2 |
| 3,561,485 | 2/1971 | Klingler | 137/625.17 |
| 3,730,222 | 5/1973 | Moen | 137/625.17 |
| 3,840,048 | 10/1974 | Moen | 137/625.41 |
| 3,955,598 | 5/1976 | Knapp | 137/625.17 |
| 3,958,792 | 5/1976 | Barkelew | 137/625.17 |
| 4,033,373 | 7/1977 | Manoogian et al. | 137/454.6 |
| 4,056,124 | 11/1977 | Goldsmith | 137/625.17 |
| 4,330,011 | 5/1982 | Moen | 137/625.17 |
| 5,275,195 | 1/1994 | Breda | 137/625.17 X |

*Primary Examiner*—John Rivell
*Attorney, Agent, or Firm*—Harris, Tucker & Hardin

[57] ABSTRACT

The present valve cartridge allows for the mixing of a first and second fluid flow. The cartridge (100) is formed by a shaft (102) slidably engaged in a sleeve (104). A gasket (106) surrounds the sleeve at one end. The sleeve has a first and second input aperture (124a, 124b). These apertures can cannot communicate with an output aperture (126) when the shaft is fully inserted into the sleeve. The volume of flow through the cartridge is increased upon retreating the shaft from the sleeve. The gasket (106) provides three barrier means to prevent leakage of the first fluid source into the second fluid source. A first barrier means (128a, 128b) are immediately adjacent to the inputs. The second barriers (136a, 136b) are positioned to prevent longitudinal flow of the fluid which overcomes the first barriers. A third barrier means (130, 132) prevent lateral flow of fluid which overcomes the first barriers. In another embodiment, a washer (210) compliments a ledge 206 on the outer surface of the sleeve. The washer has a non-circular inner diameter which prevents rotation of the sleeve in the valve body.

18 Claims, 5 Drawing Sheets

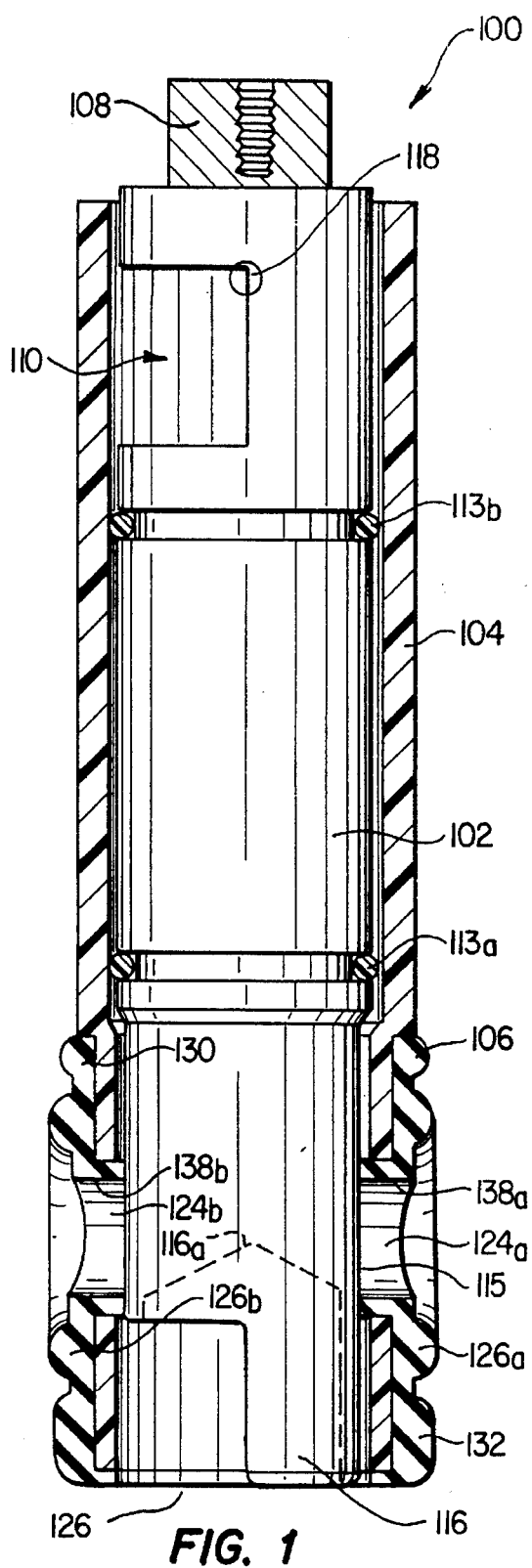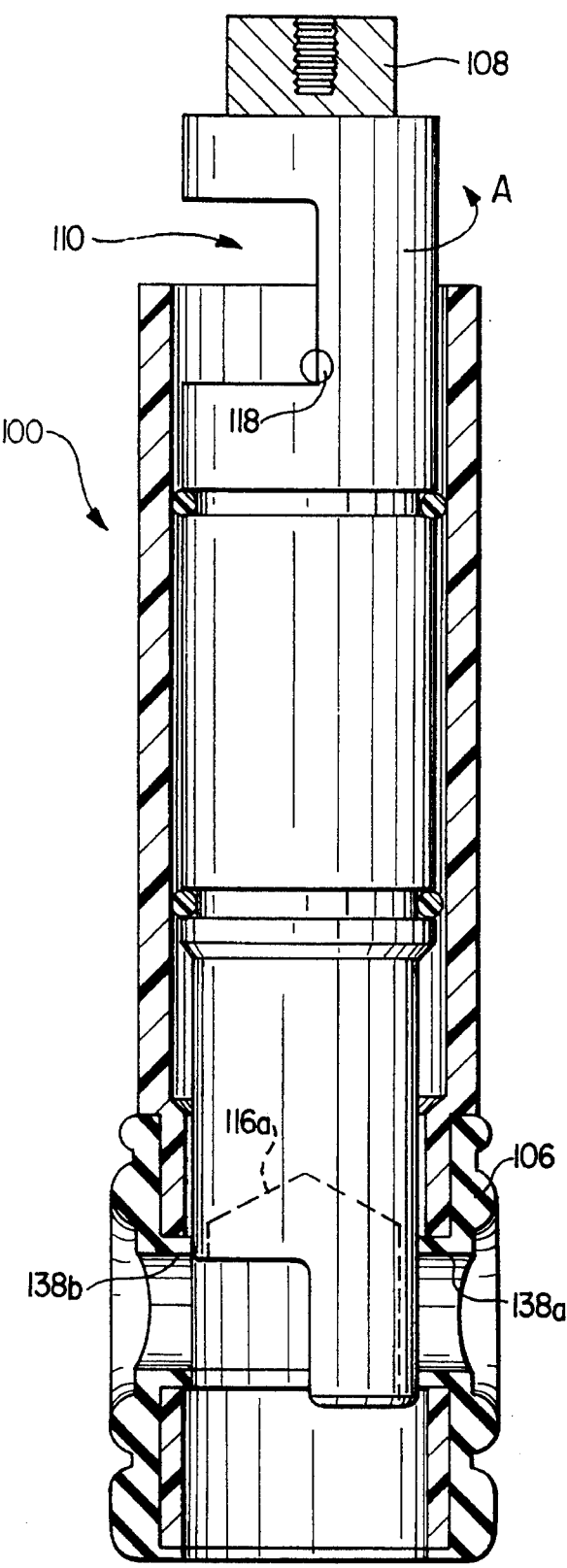

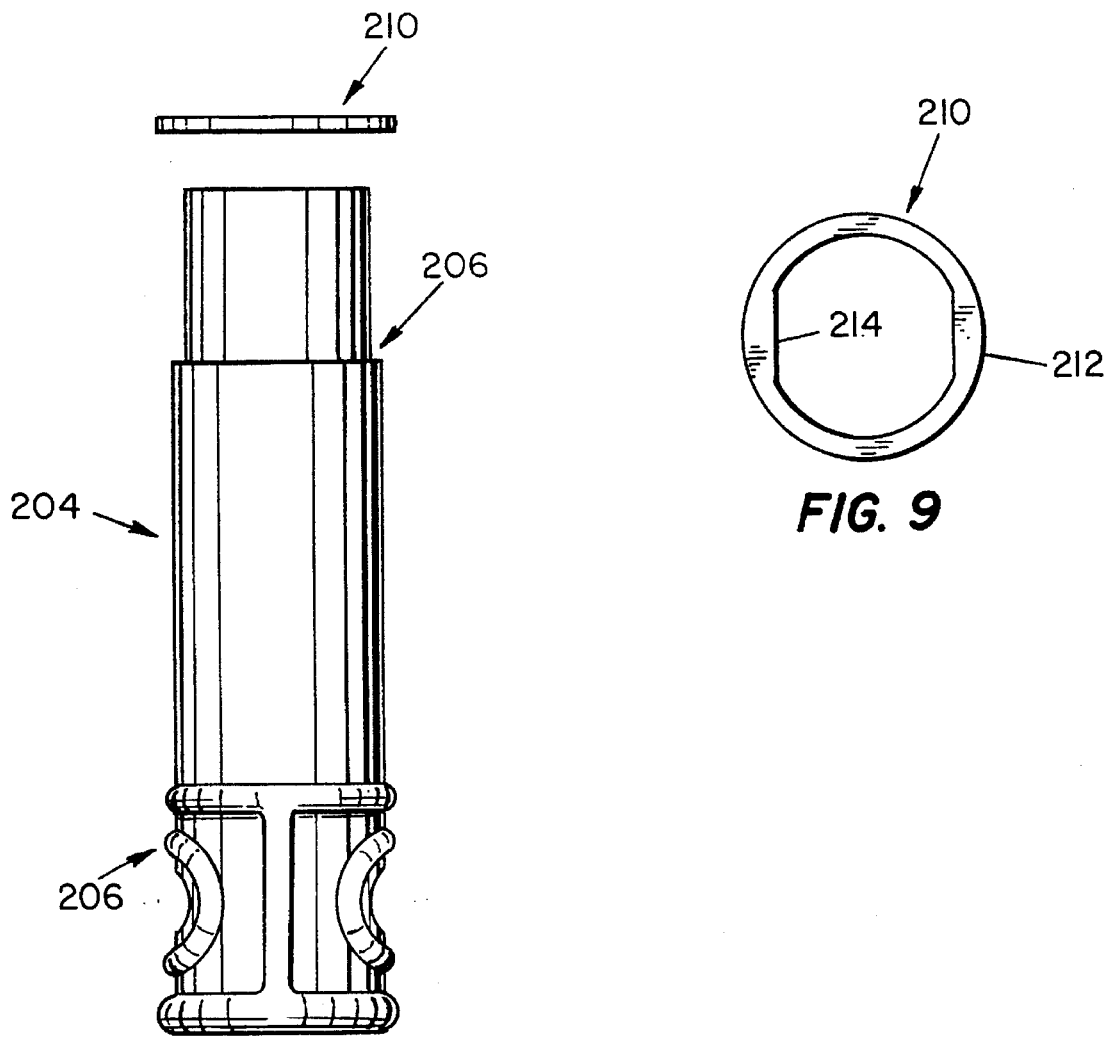

VALVE CARTRIDGE

CROSS REFERENCE TO RELATED APPLICATIONS

The present application is a continuation-in-part of co-pending application Ser. No. 08/151,294, filed Nov. 15, 1993 now U.S. Pat. No. 5,400,822, and entitled "Valve Cartridge."

TECHNICAL FIELD OF THE INVENTION

The present invention relates to a valve cartridge. The valve cartridge is placed into a mixing valve and can selectively control both the volumetric flow of fluid through the valve as well as the mixture of a first and second input to the valve.

BACKGROUND OF THE INVENTION

A valve is commonly used to control the flow of a fluid between an input and an output. Specialized valves, known as mixing valves, have been developed to allow the combination of two inputs. Mixing valves can also control the volumetric flow from the inputs. Mixing valves are typically used in a water system to mix hot and cold water. For example, mixing valves are commonly found in bathrooms and kitchens, where they allow the user to produce varying degrees of warm water.

One mixing valve is particularly widespread in the marketplace. The model 963 mixing valve by the Mixet Co., a division of Alsons Corp, of Pico Rivera, Calif. has been placed in millions of apartments and homes throughout the United States. FIG. 4 provides a sectional view of the Model 963 valve designated by reference numeral 10. The valve 10 comprises a valve cartridge threaded within the valve body 11. The valve body has a first input 12 and a second input 14. Each input is connected to an output 18 by a passage formed within the valve body 11. Conduits 12a, 12b connect input 12 to mixing area 16. Conduits 14a and 14b connect input 14 to mixing area 16. The mixed water then enters output 18. Many times the output 18 can be directed to either a shower head or a bath tub faucet.

In use, the cartridge can be advanced or retreated within the valve body 11 by a handle attached to connection 22. When fully advanced, the cartridge 20 bloch the flow of water. A gasket 28 is attached to the cartridge by screw 30. However, the cartridge head 26 has a radial surface of diminished diameter. Thus, when the cartridge is retreated away from the mixing area, as shown, the diminished area opens a path between the inputs 12 and 14 and the output 18. An O-ring 24 prevents leakage between the cartridge 20 and the valve body 11.

The Mixet Model 963 displays a serious problem caused by the design of its valve cartridge 20. The cartridge fails to adequately seal the space between wall 13 and cartridge head 26. Due to the diminished radial diameter of a portion of the head 26, very little material separates the pressurized water in conduit 12a and conduit 14a. Therefore, water will erode a pathway between the head portion 26 and the wall 13 adjacent to conduits 12b and 14b. Once eroded, water from one supply "bleeds" into the other supply. For example, if the hot water supply is at a higher pressure than the cold water supply, the hot water will displace cold water in the cold water input lines. This can produce severe and unwanted results. For example, a person using a sink with an eroded valve structure could easily scald themselves with hot water when expecting cold water. This problem is severe enough that city inspectors can close an apartment complex down to force the owners to replace the faulty valves. Replacement is an expensive procedure. The wall around the valve must be destroyed and the valve removed, at a cost of hundreds of dollars.

A need exists for a valve cartridge that can easily replace the existing valve cartridge to prevent such erosion. Such a valve should also be suitable for placement into an eroded valve structure where it can seal the eroded portion. Such a replacement valve cartridge should also resist being rotational displaced when aggressively turned by a user.

SUMMARY OF THE INVENTION

The present valve cartridge is designed to work within a mixing valve to mix a first input and a second input. The cartridge is formed by a shaft slidably engaged in a sleeve. A gasket surrounds the sleeve at one end. The sleeve has a first and second input aperture. These apertures cannot communicate with an output aperture when the shaft is fully inserted into the sleeve. The volume of flow through the cartridge is increased upon retreating the shaft from the sleeve. Mixing is accomplished by rotating the shaft. The distal end of the shaft has a partial cylindrical shell which can selectively block, or partially block, the input apertures. In other words, the shaft is pulled back to initiate flow from both inputs. The shaft is then rotated to control the ratio of the two inputs.

The gasket provides three barrier means to prevent leakage of the first fluid source into the second fluid source. A first barrier means are immediately adjacent to the inputs. The second barriers are positioned to prevent longitudinal flow of the fluid which overcomes the first barriers. A third barrier means prevent lateral flow of fluid which overcomes the first barriers. The gasket is dimensioned to seal even eroded surfaces within a valve body. Thus, the present valve cartridge can easily replace the existing valve cartridge to prevent erosion within the valve body. The present valve cartridge is also suitable for placement into an eroded valve structure where it can seal the eroded portion. In one embodiment, a locking washer is placed around the sleeve where it engages a ledge on the outer surface of the sleeve.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 1 is a sectional view of the valve cartridge in a dosed position;

FIG. 2 is a sectional view of the valve cartridge in an open position, but with the shaft rotated to only allow the flow of a fluid from a first input;

FIG. 8 is an exploded view of the washer and the sleeve; and

FIG. 9 is a flat view of the locking washer.

DETAILED DESCRIPTION OF THE DRAWINGS

Figure 6:
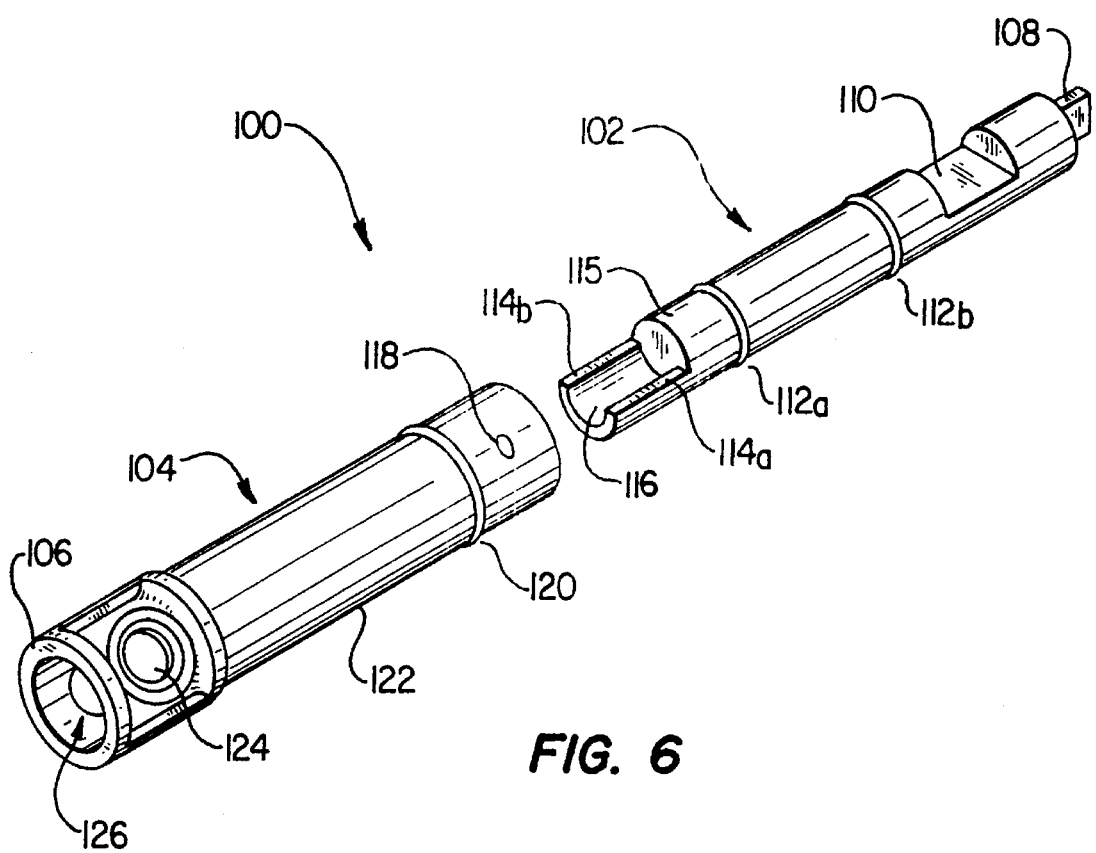
FIG. 6 is an exploded perspective of the valve cartridge.
Figure 7:
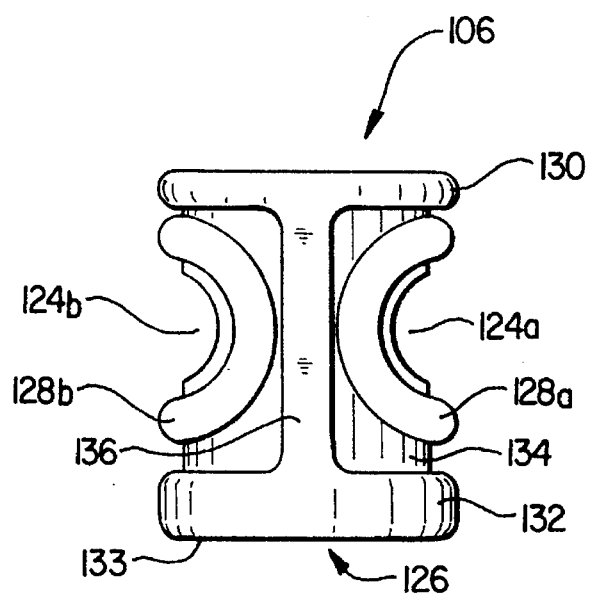
FIG. 7 is a detailed side view of the gasket.

The present invention relates to a valve cartridge, specifically to a valve cartridge for use with a two input mixing valve such as the Model 963 mixing valve by the Mixet Company. Referring to FIGS. 6 and 7, a valve cartridge 100 is illustrated embodying the present invention. The valve cartridge 100 comprises a shaft 102 which slidingly engages a sleeve 104. A gasket 106 envelopes the distal end of the sleeve 104. In a preferred embodiment, the sleeve 104 is made of yellow brass, the gasket is molded from neoprene rubber, and the shaft is made from stainless steel. The shaft can be tempered to a hardness of #2 on a Grommet scale. The gasket can be fixed to the sleeve by an adhesive or by friction.

The sleeve 104 is generally tubular and open at both ends. The sleeve is penetrated by a pair of opposed input apertures 124a, 124b. An output aperture 126 is shown adjacent to the inputs 124a, 124b. The gasket 106 surrounds the inputs and output apertures. The gasket 106 has a first and second opening which coincide with the input apertures 124a, 124b, and a third opening to coincide with output aperture 126. The gasket 106 comprises a surface portion 134 and three barrier means to prevent leakage from either the first or second input into the other. A first barrier means 128a, 128b are immediately adjacent to the inputs. The second barriers 136a, 136b are positioned to prevent longitudinal flow of the fluid which overcomes the first barriers. A third barrier means 130, 132 prevent lateral flow of fluid which overcomes the first barriers.

In a preferred embodiment, the gasket 106 is approximately 1.00 inch in length and 0.804 inch in outer diameter. The gasket has can have an inner diameter of approximately 0.604 inch. A pair of flange portions 138a, 138b, shown in FIG. 2, can extend into the first and second input apertures 124a, and 124b. The flange portions intrude beyond the boundary of the sleeve and can contact the shaft. The input apertures are typically circular with a diameter of about 0.406 inch. The diameter of the coincidental openings in the gasket have a diameter of approximately 0.300 inch, the difference representing the width of the flange portions. The first barrier means 128a, 128b are generally circular ridges with each ridge having a radius of curvature of approximately 0.0640 inch. The second barrier means 130, 132 are placed to prevent the longitudinal flow of fluid which escapes beyond the first barrier means. The second barrier means 130 encircles the sleeve with a ridge having a radius of curvature of approximately 0.0480 inch. The second barrier means 132 encircles the distal end of said sleeve and has a width of about 0.050 inch with curved edge portions having a radius of curvature of about 0.064 inch. The third barrier means comprises at least two ridges 136a, 136b (not shown) which extend between the second barrier means 130, 132. The gasket also has a forward face 133. Of course, the dimensions provided only represent those used in a preferred embodiment. The gasket can be sized to suit any particular situation.

The shaft 102 has a connector 108 at its proximal end and a flow control means 116 at its distal end. The flow control means is a partial cylindrical shell bored into the distal end of the shaft. A portion of the cylindrical shell is removed to produce edge boundaries 114a, 114b. The boundaries 114 define an arc greater than 180 degrees. Two O-ring grooves 112a, 112b encircle the shaft. O-rings, not shown, can be seated in these grooves to produce a sliding seal between the shaft 102 and the sleeve 104. A set screw placed in threaded opening 118 cooperates with a notch 110 to limit the longitudinal and radial travel of the shaft within the sleeve.

Figure 3:
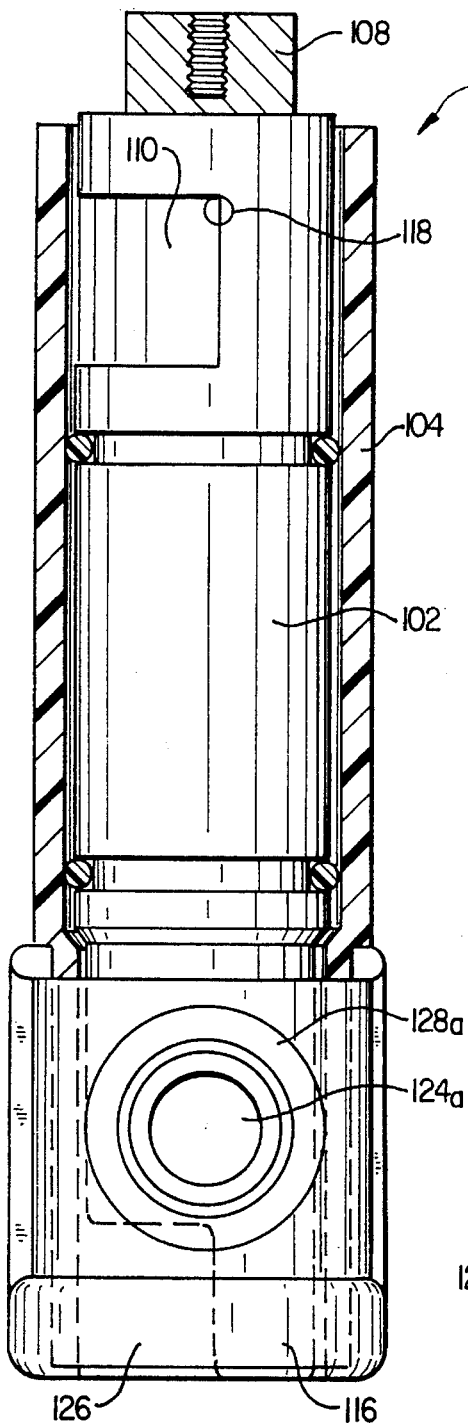
FIG. 3 is another sectional view of the valve in a closed position as in FIG. 1, but from a view showing the sleeve gasket opening over the input opening.
Figure 4:
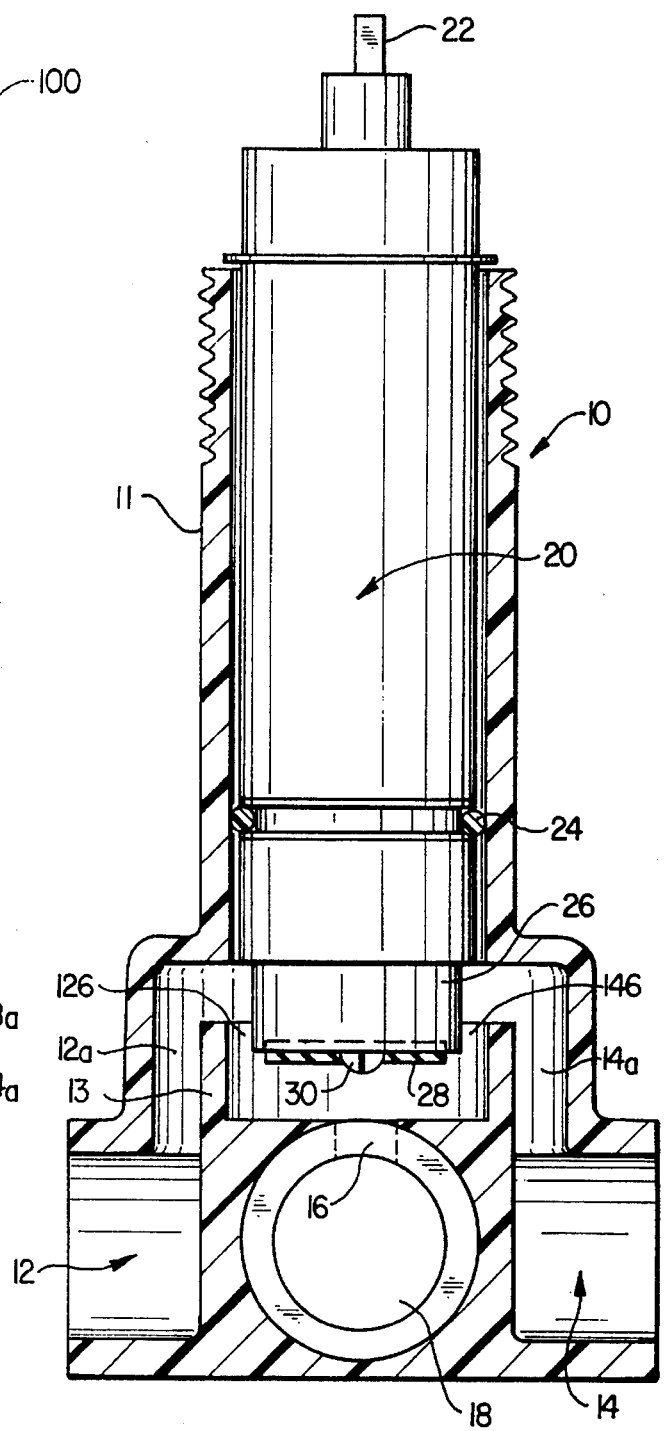
FIG. 4 is a sectional view of the prior art valve cartridge in a mixing valve.

FIGS. 1 and 3 provide sectional views of the shaft 102 fully advanced within the sleeve 104. Input apertures 124a, 124b are blocked by surface 115, thus preventing flow from either input. As earlier discussed, the gasket flange portions 138a, 138b extend beyond the internal diameter of the sleeve and contact the shaft to form a sliding seal. A screw in the set screw hole 118 contacts the rear surface of the notch 110, thus preventing the shaft from further forward travel. O-rings 113a, 113b prevent any leakage of fluid between the shaft and the sleeve.

FIG. 2 illustrates the shaft withdrawn to a fully open position. A set screw in set screw hole 118 contacts the forward edge of notch 110, thereby limiting further rearward travel. The flow control means 116 is rotated to block the flow of water from the first input aperture. Thus water is flowing entirely from the second input aperture to the output. The shaft can be rotated as shown by arrow A to an intermediate position where flow is available equally from both sources. Likewise, it can be rotated to block off only the second input aperture. Of course, the ratio of first and second flows is infinitely variable between the two extremes. The rotation of the shaft is also controlled by a set screw contacting the boundary of the notch 110. The distal end of the shaft can present a surface 116a to the flow of water. The surface 116a can be any shape but is preferably spherical or conical.

Figure 5:
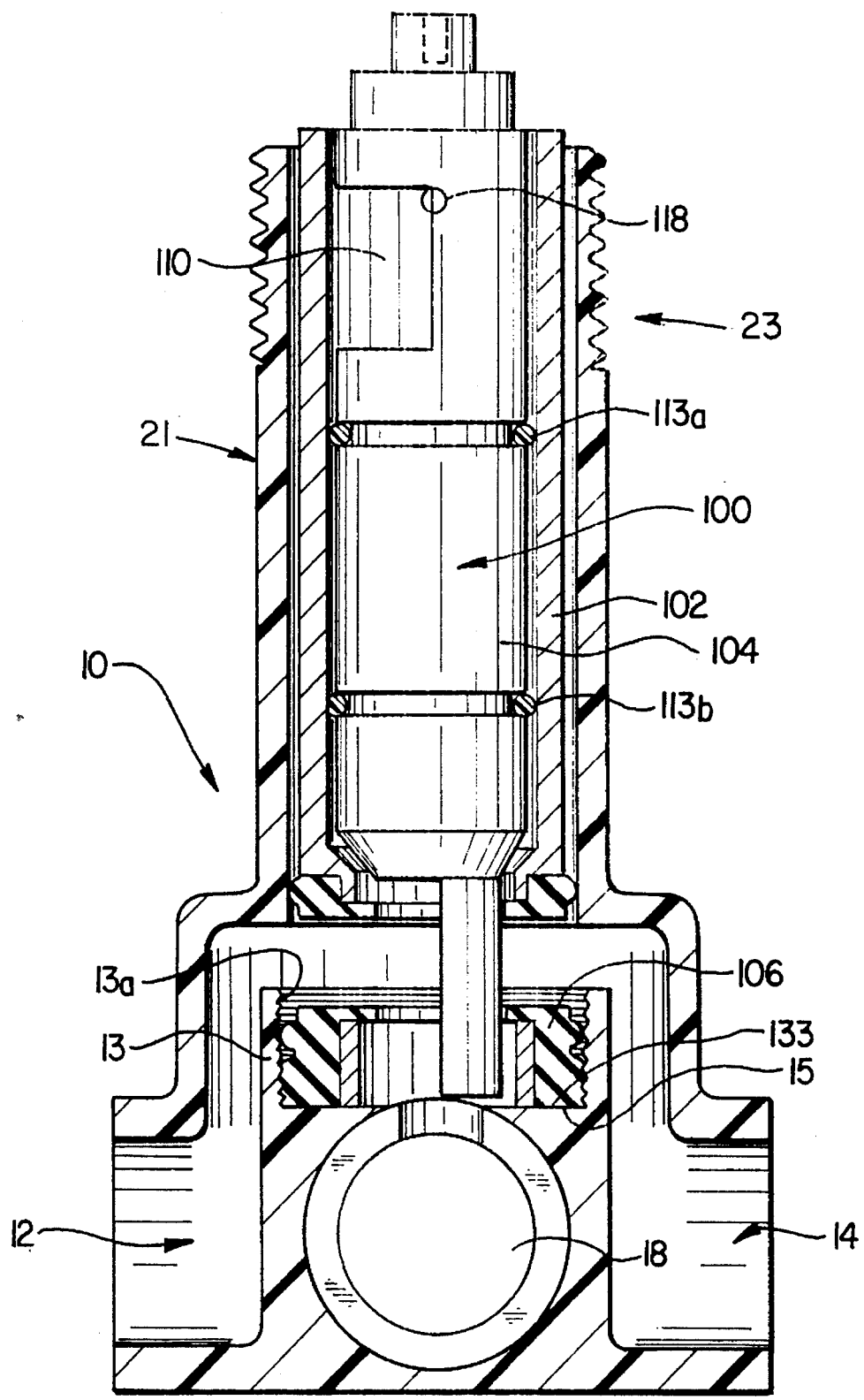
FIG. 5 illustrates the present invention placed in a mixing valve such that the sleeve gasket effectively seals the eroded passage between the valve and valve cartridge.

FIG. 5 provides a sectional view of the present valve cartridge inserted into an eroded mixing valve. As shown, surface 13a of wall 13 has been eroded. The valve is shown in a closed position. The prior art valve discussed above, could allow fluid from the first source to bleed into the second source through the eroded passages. The first and third barrier means effectively seal against the eroded surface, thus preventing any "bleeding" between the two fluid sources. The forward face 133 of the gasket 106 is compressibly sealed against eroded valve seat 15.

FIGS. 8 and 9 illustrate an alternative embodiment of the invention. As discussed above, when the shaft is rotated inside the sleeve by the user, its travel is limited by a set screw impacting on a stop surface. If the user continues to aggressively turn the shaft, the entire shaft and sleeve can be rotated within the valve body. This creates misalignment and even nonalignment of the input apertures of the cartridge and the inputs of the valve body. FIGS. 8 and 9 illustrate the use of a washer 210 which engages a ledge 206 on the outside surface of the sleeve 204. The washer 210 sets within a groove in the inner diameter of the throat 21 of the valve body. An appropriate fitting (not shown) engages the threads 23 of the valve body throat 20 (best shown in FIG. 5) and pinches the washer in place. The washer 210 has a non-circular inner diameter 214 which compliments the ledge 206 on the sleeve. The sleeve cannot rotate without deforming the washer.

In one embodiment, the invention relates solely to a gasket with a forward face. The gasket is configured to slidably engage over a sleeve used in a valve body having a gasket seat around an output. The gasket's forward face creates a compression seal against the gasket seat. In another embodiment, the invention relates to a sleeve having such a gasket already affixed thereto. In another embodiment, the invention relates to a sleeve and gasket in conjunction with a shaft as described above. In another embodiment, the invention relates to a sleeve and gasket in conjunction with a rotational lock means to prevent unwanted rotation of the sleeve in the valve body.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A valve cartridge for use in a valve body that has a gasket seat around an output and for use in mixing a first and a second fluid flow through the valve, said cartridge comprising:
   (a) a sleeve defining a central passage, said sleeve having a first and second input aperture and an output aperture; and
   (b) a gasket fixed around the distal end of said sleeve, said gasket having a first and second aperture positioned coincident with the first and second input apertures, wherein said gasket further includes a forward face which creates a compression seal against the gasket seat.

2. The valve cartridge of claim 1 further comprises:
   (c) a shaft slidably engaged within said passage, said shaft having flow control means, said shaft being translatable between a first and second position.

3. The valve cartridge of claim 1 further comprising:
   (c) a washer slidably engaged to the sleeve, said washer configured to prevent the rotation of the sleeve within the valve.

4. The valve cartridge of claim 3 wherein said washer has a non-circular inner diameter.

5. The valve cartridge of claim 4 wherein said sleeve has a ledge which compliments the non-circular inner diameter of the washer.

6. The valve cartridge of claim 2 wherein said shaft bloch flow between the input apertures and the output aperture in said first position.

7. The valve cartridge of claim 2 wherein said shaft allows flow between the input apertures and the output aperture in said second position.

8. The valve cartridge of claim 2 wherein said shaft is rotatable between a third position and a fourth position.

9. The valve cartridge of claim 7 wherein said shaft only allows flow between the first input aperture and the output aperture when in the second translational and third rotational positions.

10. The valve cartridge of claim 7 wherein said shaft only allows flow between the second input aperture and the output aperture when in the second translational and fourth rotational positions.

11. The valve cartridge of claim 2 wherein said shaft further comprises travel limit means.

12. The valve cartridge of claim 1 wherein said gasket comprises a first, second and third barrier means to prevent leakage.

13. The valve cartridge of claim 12 wherein said first barrier means comprise ridges around the input aperture.

14. The valve cartridge of claim 12 wherein said second barrier means comprise around each end of the gasket.

15. The valve cartridge of claim 12 wherein said third barrier means comprise ridges between the second barrier means.

16. The valve cartridge of claim 1 wherein said flow control means comprises a partial cylindrical shell at the distal end of said shaft.

17. The valve cartridge of claim 1 wherein said partial cylindrical shell has an arc greater than 180 degrees.

18. A valve cartridge for use in a valve body that has a gasket seat around an output and for use in mixing a first and a second fluid flow through the valve, said cartridge comprising:
   (a) a sleeve defining a central passage, said sleeve having a first and second input aperture and an output aperture;
   (b) a shaft slidably engaged within said passage, said shaft having flow control means, said shaft being translatable between a first and second position;
   (c) a gasket fixed around the distal end of said sleeve, said gasket having a first and second aperture positioned coincident with the first and second input apertures, wherein said gasket further includes a forward face which creates a compression seal against the gasket seat; and
   (d) a washer slidably engaged to the sleeve, said washer configured to prevent the rotation of the sleeve within the valve.

* * * * *